June 2, 1942. P. C. RECK 2,285,304
HORN MOUNTING
Filed Sept. 14, 1939
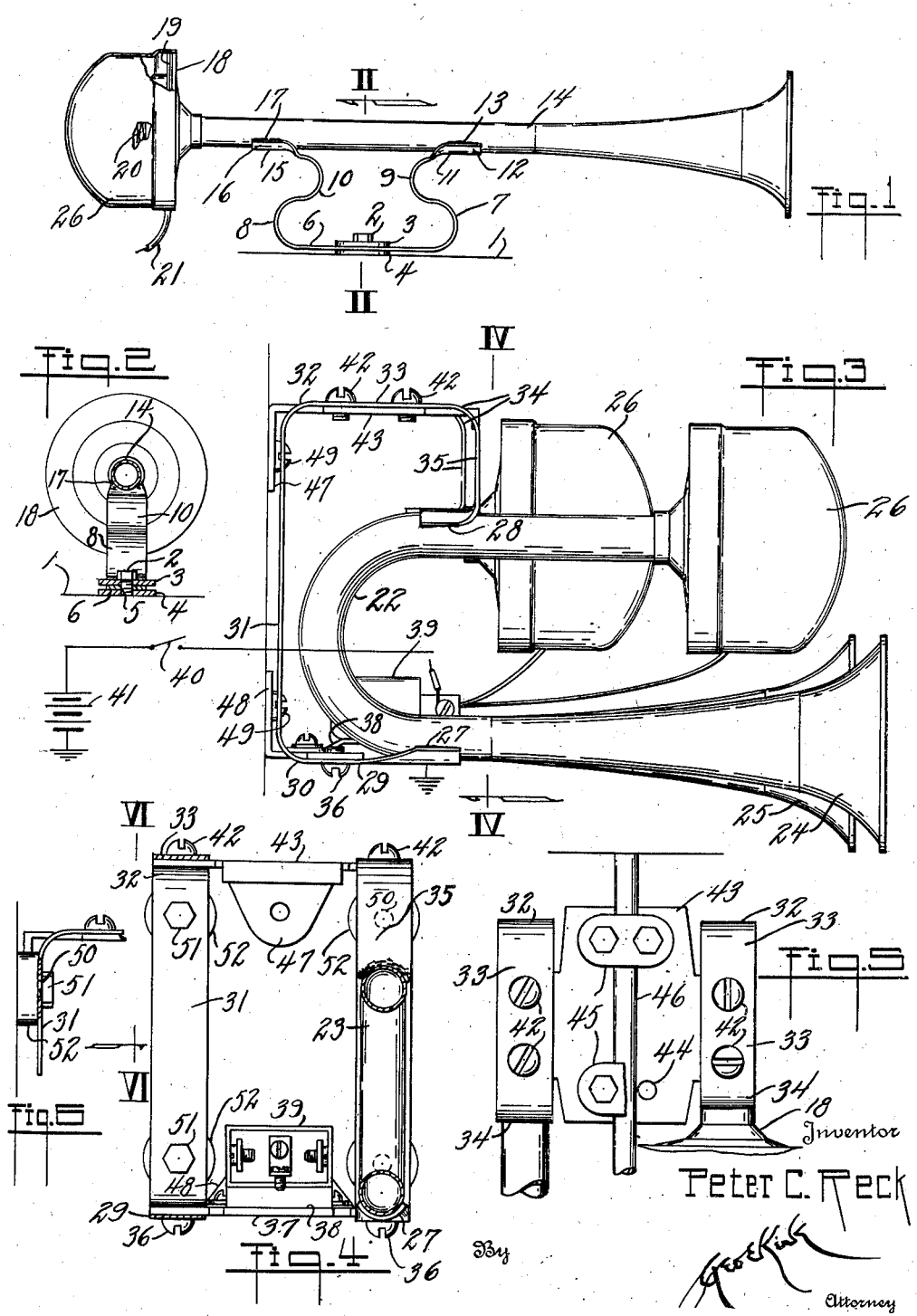
Inventor
Peter C. Reck
By
Attorney Patented June 2, 1942

2,285,304

UNITED STATES PATENT OFFICE 2,285,304

HORN MOUNTING

Peter C. Reck, Adrian, Mich., assignor to Schwarze Electric Company, Adrian, Mich., a corporation of Michigan Application September 14, 1939, Serial No. 294,935

1 Claim. (Cl. 177—7)

This invention relates to detracting from vibration disturbance of sound producers.

This invention has utility when incorporated in diaphragm types of horns, especially for motor vehicles with advantages in the mountings hereunder to avoid or minimize undesirable influence arising from operation of such structure in its assembly.

Referring to the drawing:

Fig. 1 is a side elevation of an embodiment of the invention for a motor vehicle horn or signal;

Fig. 2 is a section on the line II—II, Fig. 1, showing the mounting features therefor;

Fig. 3 is a side elevation of a twin horn structure having features of the invention therein;

Fig. 4 is a view on the line IV—IV, Fig. 3, showing rearward support from the loops of the mounting structure;

Fig. 5 is a further detail of the mounting in plan supported on a rod from a plate between the loops of the bracket for the horn pair of Fig. 3; and Fig. 6 is a section on the line VI—VI, Fig. 4, showing detail features of the mounting.

Mounting or support 1 may be a place exposed for upward horizontal, lower horizontal, or vertical side face as a motor vehicle body or chassis which may have bolt 2 therefrom, having washers 3, 4, providing gripping faces for any angle engagement through opening 5 in strap having straight or flat portion 6, with similar bows 7, 8, outward to complementary bows 9, 10, inward. The bow 9 has straight portion 11 providing concave face 12, anchored by brazing, soldering or welding 13 with trumpet 14. From the curved portion 10 there is oppositely extending straight portion 15 having concave seat 16 anchored by weld, braze or solder 17 and spaced by the anchorage from the portion 11. These two anchorages with the trumpet 14 are not only spaced from each other but spaced from housing 18 having therein diaphragm 19 adapted to be actuated by electromagnet 20, energizing current for which is supplied through line 21. This strap mounting as flatwise transversely of the direction of the trumpet 14 is adapted for rigidly supporting the horn against strains or shocks transversely or widthwise of this strap mounting. There is thus an efficiency of operation under that contemplated for the equipment and the take-up is in the bow portions 7, 9, and 8, 10, as functioning cooperatively to respond to the shock.

This general end of single holding strap mounting wherein the strap is of extent along the trumpet as to its flatwise portion toward the trumpet is effective even for trumpets having return bend 22 (Fig. 3). In fact, this assembly may be readily set up as twin mounting with companion horn having return bend 23. These horns have respective bells 24, 25, and housings 18 carry diaphragm and electromagnet actuators within dome 26. In this set-up there may be channel shape weld, braze or solder portions 27, 28, as an anchorage pair engaging the return bend or U-portions at the different legs thereof and accordingly spaced from each other.

The loop portion of the mounting between the portions 27, 28, is shown to comprise straight section 29, corner 30, straight section 31, corner 32, straight section 33, corner 34, to straight section 35. Bolt 36 may mount strap 37 between the straight portions 29 in providing deck 38 for mounting relay 39, whereby push switch 40 may cut in current from battery 41 for the desired sounding or functioning of the horn. Bolts 42 through the straight portions 33 may mount plate 43. This plate 43 has openings 44 (Fig. 5) providing mountings for clamps 45, thereby adapting the device to be mounted on rod 46 from the dash say to the motor. This would leave the flat portions away from this deck 43 in position for flexing as to this anchorage or mounting. In this instance there are the spaced anchorages 27, 28, with the respective trumpets and away from the housings for such trumpets.

Additional or independent mounting may be effected for the deck 43 having ear 47 (Fig. 3) directed toward ear 48 from the deck 37. Through these ears 47, 48, bolts 49 may mount the twin horns on a vertical wall under the hood say as on the motor side from the instrument board or panel, or under the cowl. With both brackets 47, 48, anchored by a bolt 49, there is more rigidity than with the use of but one thereof. This leaves the flat region 31 between the mountings as sufficient for more or less flexing in response to operations hereunder. The straight portions 31 adjacent the bends 30, 32, have openings 50 which may be engaged by bolts 51 as in washers 52, similar to the bolt 2, thereby allowing the intermediate straight portions 31, as away from the mounting, to flex somewhat.

The strap mounting for each trumpet takes up actuator vibration independently of external disturbance. Furthermore, the mounting tends to suppress or dampen external vibration against disturbance of the function of the horn.

What is claimed and it is desired to secure by United States Letters Patent is:

A sound projecting device for use on an engine-driven vehicle, the device embodying a housing containing a diaphragm and means for actuating this diaphragm, a trumpet section extending outward from the housing, a mounting for the projecting device having a pair of spaced anchorages along the trumpet section at different distances from the housing, this mounting including a flat spring leaf member having its flat portion transversely of the axis of the trumpet section, the length of this member being substantially in alignment with the trumpet section, this member having bent portions in it to provide greater resiliency, each end of this member being attached to one of the anchorages and an intermediate portion of this member being attached to a fixed support.

PETER C. RECK.